United States Patent
Tanaka

[11] 4,146,305
[45] Mar. 27, 1979

[54] VARIABLE LENS WHICH CAN HAVE ITS FOCAL DISTANCE RANGE EASILY CHANGED

[75] Inventor: Kazuo Tanaka, Tokyo, Japan

[73] Assignee: Canon Kabushiki Kaisha, Tokyo, Japan

[21] Appl. No.: 784,787

[22] Filed: Apr. 5, 1977

[30] Foreign Application Priority Data

Apr. 9, 1976 [JP] Japan .................................. 51-39960
May 17, 1976 [JP] Japan .................................. 51-56265
Aug. 17, 1976 [JP] Japan .................................. 51-98427

[51] Int. Cl.² ...................... G02B 15/02; G02B 15/18
[52] U.S. Cl. ........................................ 350/183; 350/184
[58] Field of Search ................................ 350/183, 184

[56] References Cited
U.S. PATENT DOCUMENTS

2,906,172  9/1959  Klemt .................................. 350/184
4,015,895  4/1977  Hirose .................................. 350/184

*Primary Examiner*—Conrad J. Clark
*Attorney, Agent, or Firm*—Toren, McGeady and Stanger

[57] ABSTRACT

A variable magnification lens which can have its focal distance range easily changed and has a focusing lens group, a variable lens group and an imaging lens group positioned in said order from an object side, wherein said imaging lens group has a fixed front lens group, a movable middle lens group, a fixed rear lens group in said order from an object side, further an attachment lens is provided in a freely dismountable manner on an optical axis between said front lens group and the rear lens group, and when said attachment lens is mounted said middle lens group is shifted to a prescribed position, thus the focal distance range of the variable magnification lens will be different between a time when the attachment lens is mounted and a time when the same is not mounted.

5 Claims, 12 Drawing Figures

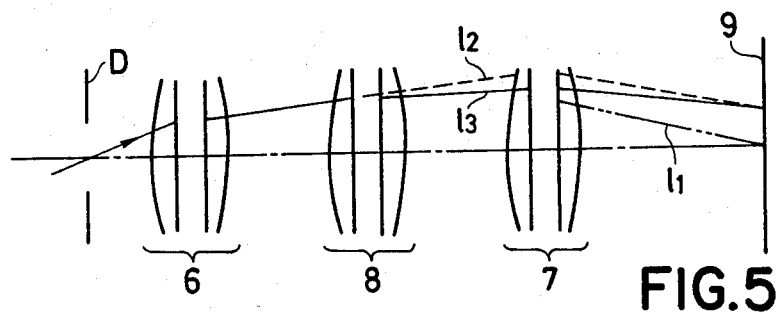
FIG.5
FIG.6
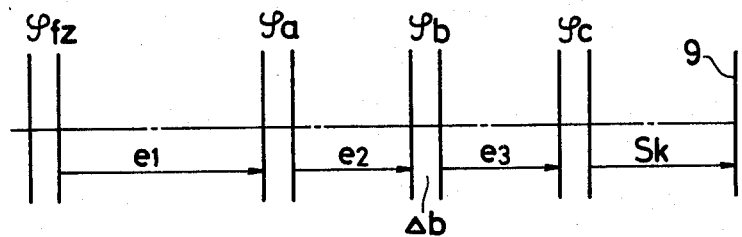
FIG.7
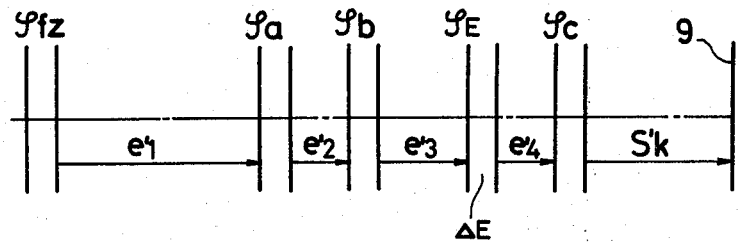
FIG.10
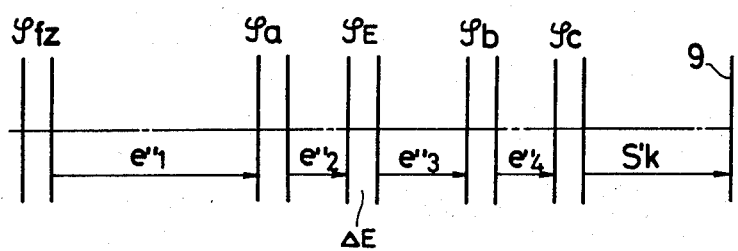
FIG.11
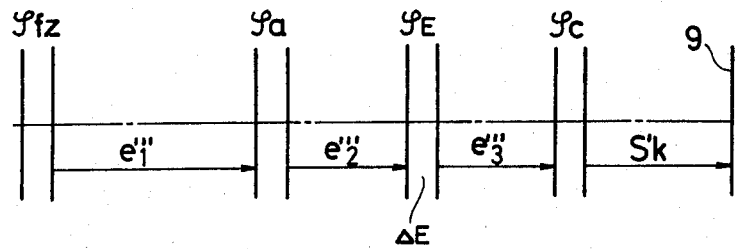

VARIABLE LENS WHICH CAN HAVE ITS FOCAL DISTANCE RANGE EASILY CHANGED

BACKGROUND OF THE INVENTION

The present invention relates to a zoom lens particularly to an optical system which is suitable as a photographing lens for a television and can have a focal distance range which can be zoomed easily changed by inserting a lens group for magnification variation into a basic zoom lens.

As a method for shifting a focal distance range of a zoom lens the followings have been known:

That is, (1) a so-called converter system to provide an affocal lens system an angular magnification of which is not 1 in front of a zoom lens, (2) a system to mount an attachment lens between a zoom lens and a camera main body, (3) a system to replace a relay part positioned at an imaging plane side in the rear of a zooming part of a zoom lens with another relay part having different focal distance, (4) a double zoom system containing a zoom system within a relay part, and (5) a system (Japanese Patent Application Sho 48-8118) to insert an attachment lens within a relay lens part consisting of two groups.

Of these systems, in the systems (1), (2) and (3) it is difficult to instantly change a focal distance, and a back focus of the total lens system can not be retained unchanged, further a total lens length will vary. Also the system (4) results in a considerably long total length.

On the other hand in a system of an attachment provided within a zoom lens system, which is the system (5), even if a total length of a basic zoom lens is a bit longer, the change of a focal distance can be done in an instant, and a back focus can be retained unchanged, further a total length of the zoom lens can be retained constant regardless of mounting or dismounting of an attachment lens. Also the number of lenses used will be smaller than that in the system (4), thus cost will be less.

In a conventionally known built-in extender system, two lens group constituting a relay lens are fixed and a lens group to extend a focal distance is mounted between said two groups, thus changing a focal distance while retaining a back focus unchanged. However, when this type of zoom lens is used as a taking lens for a color television camera, a tri-color separation optical system needs to be placed in the rear of an image pick up lens, therefore the back focus distance has to be made sufficiently long. However, since an interval between the front group and the rear group of the imaging lens is made long to have an extender mounted thereat, when an image pick up lens is so designed as to be a bright lens having a small F-number, the lens diameter of the rear group becomes excessively large compared to that of the front group.

SUMMARY OF THE INVENTION

It is an object of the present invention to make the F-number of a lens system of a built-in extender type small and to keep the lens diameter of the rear group in the imaging lens small while providing a sufficient length at a back focus distance for having a color separation system for a color television provided thereat.

A variable magnification lens system according to the present invention has a focusing lens group, a magnification variation lens group to vary magnification of the luminous flux from said focusing lens group, an imaging lens group to image the luminous flux from said magnification variation lens group and an attachment lens provided in a freely insertable and detachable manner on an optical axis of said variable magnification lens system. Said imaging lens consists of a fixed front lens group, a movable middle lens group, a fixed rear lens group being positioned in said order from an object side, while said attachment lens is provided in a mountable and dismountable manner on an optical axis between said front lens group and the rear lens group.

When said attachment lens is mounted, said middle lens group is shifted. There is a first case wherein the middle lens group is shifted along the optical axis of the variable magnification optical system and a second case wherein the same is shifted to outside of optical path of the variable magnification optical system.

While in the following descriptions on the present invention, each lens group constituting an imaging lens system has positive refractive power, generally speaking, the synthesized refractive power of an imaging lens group can be positive or negative depending on the inclination of the luminous flux impinging onto said lens group.

BRIEF DESCRIPTION OF THE DRAWINGS

Each of FIG. 2, FIG. 3

FIG. 5 is a diagram to explain the function and the effect of the variable magnification optical system according to the present invention.

FIG. 6 is a diagram to show positional relationship of the lenses in the variable magnification optical system shown in FIG. 1.

FIG. 7 is a diagram to show positional relationship of the lenses of the variable magnification optical system shown in FIG. 2.

FIG. 10 is a diagram to show positional relationship of lenses in a variable magnification optical system shown in FIG. 3.

FIG. 11 is a diagram to show positional relationship of lenses in a variable magnification optical system shown in FIG. 4.

DESCRIPTION OF THE PREFERRED EMBODIMENTS

Figure 1:
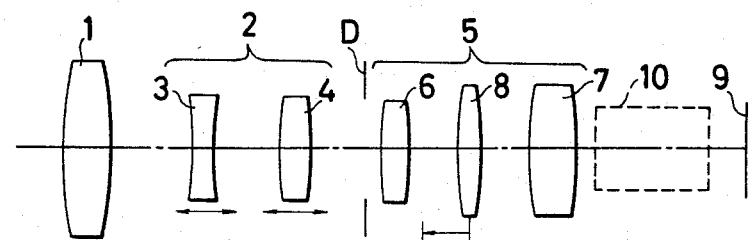
FIG. 1 is a schematic lens set up diagram in cross section to show an example of a variable magnification optical system of the present invention when an attachment lens is not mounted.

FIG. 1 is a schematic diagram to show an example of a lens set up of a variable magnification optical system according to the present invention when the above mentioned attachment lens is not mounted. In FIG. 1, what is shown as 1 is a focusing part to conduct focusing by shifting all or a portion of lenses within the same part. What is shown as 2 is a zooming part as so called in the present invention, consisting of for example a variator lens group 3 and a compensator lens group 4. What is shown as 5 is an imaging lens group, consisting of a fixed front lens group 6, a fixed rear lens group 7, and a movable middle lens group 8 being positioned said lens group 6 and the lens group 7. What is shown as 9 is an imaging plane, and 10 is a color separation optical system of a color television, while D is a diaphragm.

Figure 2:
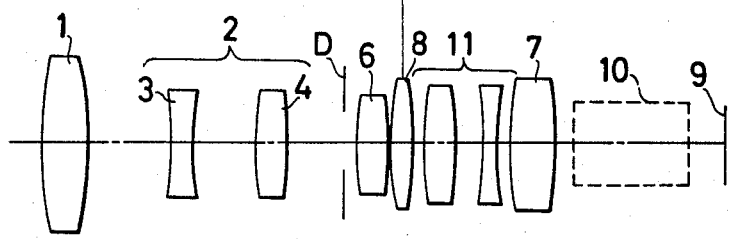
Figure 3:
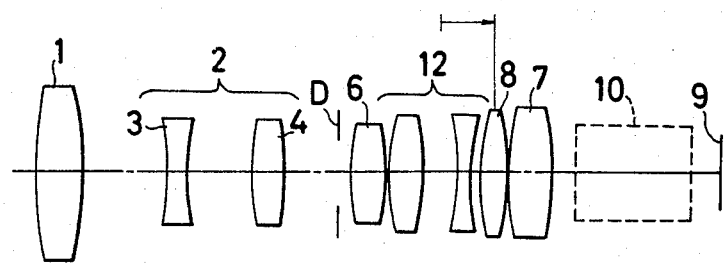
Figure 4:
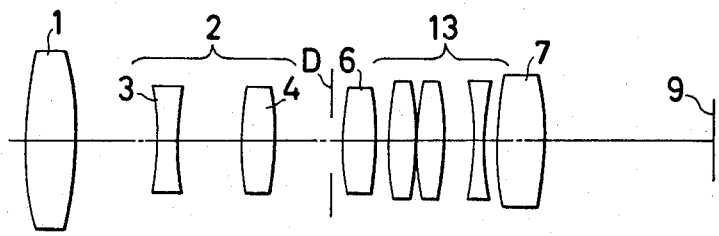
FIG. 4 is a schematic lens set up diagrams to show lens cross section in a variable magnification optical system according to the present invention when an attachment lens is mounted.

FIG. 2, FIG. 3 and FIG. 4 show examples when attachment lenses are mounted on the lens system shown in FIG. 1. FIG. 2 and FIG. 3 show a case when the middle lens group 8 is shifted on an optical axis, while FIG. 4 shows a case when the middle lens group is shifted to outside of optical path.

In the lens system shown in FIG. 2, the middle lens group 8 is shifted to an object side and an attachment lens 11 is mounted having its optical axis matched with that of the basic lens system into the lens space between the middle lens group 8 and the rear lens group 7. As the attachment lens 11 is mounted the focal distance range of this variable magnification optical system are changed.

In the lens system shown in FIG. 3, the middle lens group 8 is shifted to the imaging plane 9 side and an attachment lens group 12 is mounted having its optical axis matched with that of the basic lens system into the lens space between the middle lens group 8 and the front lens group 6. As said attachment lens group 12 is mounted the focal distance range of this variable magnification optical system are changed.

In the lens system shown in FIG. 4, the middle lens group 8 is shifted to outside of the optical path of the lens system, and instead an attachment lens 13 is mounted having its optical axis matched with that of the basic system into the lens space between the front lens group 6 and the rear lens group 7. As said attachment lens group 13 is mounted the focal distance range of this variable magnification optical system are changed.

Also as a pattern of a lens system there is a case in which a fixed lens is positioned between the diaphragm D and the zooming part 2, and this fixed lens will be included in the front lens group 6 in this specification.

Also the attachment lenses (11, 12, 13) shown in FIG. 2 to FIG. 4 are of so-called Galilean telescopic type having position refractive power positioned at an object side and having negative refractive power positioned at an imaging plane side. When an attachment lens is of such Galilean telescopic type, the focal distance range of said variable magnification lens system is shifted to longer focal point side when an attachment lens is mounted regardless of the nature of refractive power of the attachment lens whether it is positive or negative.

Contrary to this, in a so-called inverted telephoto type lens system, in which an attachment lens has negative refractive power at its object side and has positive refractive power at its imaging plane side, the focal distance range of the variable magnification lens system is shifted to shorter focal point side when an attachment lens is mounted regardless of the nature of the refractive power of the attachment lens whether it is positive or negative.

Whether the power of said attachment lens is positive or negative is determined by the positional relationship of said attachment lens and a lens group (called as a lens group A) which is a lens group within the imaging lens and is positioned closer to an object side than said attachment lens, and a lens group (called as a lens group B) which is also a lens group within the imaging lens and is positioned closer to the imaging plane side than said attachment lens. To describe the same in further detail, when the position of rear principal point of said lens group A is closer to an object side than the position of the front principal point of the attachment lens and the position of the rear principal point of the attachment lens is closer to an object side than the position of the front principal point of said lens group B, the refractive power of the attachment lens is positive. Also, when the position of the rear principal point of said lens group A is closer to an imaging plane side than the position of the front principal point of the attachment lens, and the position of the rear principal point of the attachment lens is closer to an object side than the position of the front principal point of said lens group B, the refractive power of the attachment lens is negative.

Next, explanations will be made as to the reason why the diameter of the rear lens group can be made small in the present invention, using FIG. 5.

First, since the focal distance range is shifted to longer focal point side when an attachment lens of a telescopic type is mounted (FIG. 2, FIG. 3, FIG. 4), an angle of field of the lens system becomes narrow. Therefore, the effective diameter of the rear lens group can be made small compared to that in a case when a variable lens group is not mounted. Thus, efforts are concentrated in making the rear lens group small in a state the magnification variation lens group is not mounted.

FIG. 3 shows an imaging lens group when a magnification variation lens group is not mounted, wherein 6 is a front lens group, 7 is a rear lens group, and 8 is a middle lens group fixed at a prescribed position, while D is a diaphragm. Here, the effective diameter of the last plane of the lens must have at least a size to pass F number light beam $l_1$. Also when the upper marginal ray reaching the maximum image height is made to pass at a position being upper than the path to pass the F-number light beam of the last lens, it is advantageous in respect to the light amount on the circumferential portion, but the rear lens diameter becomes unavoidably larger that much. The $l_2$ in the drawing shows the upper marginal ray in a case when the middle lens group 8 is not present, and is exited out of the rear lens group at a position being higher when the F-number light beam $l_1$. Here, when a middle lens group having a positive refractive power is provided, the upper marginal ray refracts in a middle and becomes a light beam $l_3$ and passes through the rear lens group at a position lower than that of said light beam $l_2$, therefore the lens diameter can be that much made smaller.

That is, while the lower marginal ray out of the rays reaching the imaging plane outside of the axis is defined at a position closer to an object than the diaphragm D, upper marginal ray is determined by a lens diameter after the diaphragm. Therefore, even if the light beam reaching a certain image height and producing a same intensity of illumination is same luminous flux on a pupil plane, the diameter of the rear lens group of the imaging lens can be made small by providing a positive lens group between the front lens group and the rear lens group of the imaging lens.

However, it is impossible to mount an attachment lens in the above mentioned set up as it is. Therefore a space to mount the attachment lens is created by shifting a middle lens group along an optical axis or removing the same to outisde of an optical path, thus the focal distance range is shifted while the back focus distance of the total lens system is always retained constant.

Next, explanations will be made on a paraxial relationship of each of the examples shown in FIG. 2 to FIG. 4. FIG. 6 shows a lens arrangement corresponding to FIG. 1 while FIG. 7 shows the same corresponding to FIG. 2. In FIG. 6 and FIG. 7, what is shown as $\phi fz$ is a power of a focusing part 1 focused at infinity and that of a zooming part 2 at any desired zooming position combined together (inverse number of focal distance); $\phi a$ is a power of the front lens group 6, $\phi c$ is a power of the rear lens group 7; $\phi b$ is a power of the middle lens group 8, and $\phi E$ is a power of the attachment lens 11. Also $e_1$ is an interval between a rear principal plane (principal point) of a system which combines the focusing part and the zooming part and a front principal plane of the front lens group 6; $e_2$ is an interval between a rear principal plane of the front lens group 6 and a front principal plane of the middle lens group 8; $e_3$ is an interval between a rear principal plane of the middle lens group 8 and a front principal plane of the rear lens group 7, and $S_k$ is an interval between a rear principal plane of the rear lens group 7 and the imaging plane (back focus distance). Also $e'_1$ is an interval between a rear principal plane of a system combining the focusing part and the zooming part and a front principal plane of the front lens group 6; $e'_2$ is an interval between a rear principal plane of the front lens group 6 and a front principal plane of the middle lens group 8; $e'_3$ is an interval between a rear principal plane of the middle lens group 8 and a front principal plane of the attachment lens 11; $e'_4$ is an interval between a rear principal plane of the attachment lens 11 and a front principal plane of the rear lens group 7, and S'k is an interval between a rear principal plane of the rear lens group 7 and the imaging plane 9 (back focus distance). Also the focusing part of the zoom lens has a function of providing an object point having always a constant position (image point of the focusing part). Further since the image point of the zooming part (the object point of the imaging lens) at any desired zooming position is formed at a constant position, in this case the focusing part in a state being focused at an object point at infinity and the zooming part in any desired zooming state may be handled as one integral system without any difficulties. Also when the focal distance of the total system in a state a magnification variation lens group is not mounted is expressed by f, and the focal distance of the total system after said group is mounted is expressed by f', while the magnification of the shifting of the focal distance range is expressed by m ($>1$), (1) the focal distance becomes m times longer that is:

$$f \cdot m = f'$$

(2) the back focus distance is unchanged, that is:

$$S_k = S_{k'}, \text{ and}$$

(3) the length of the total system is unchanged, that is:

$$e_2 + e_3 = e'_2 + e'_3 + \Delta E + e'_4.$$

In the above, $\Delta E$ is a principal point interval of the magnification variation lens group. And the focal distance f' at a time when a magnification variation lens group is mounted and the back focus distance $S_{k'}$ will be given by the following:

$$f' = \frac{1}{[\phi_{fz}, -e_1, \phi_a, -e'_2, \phi_E, -e'_3, \phi_b, -e'_4, \phi_c]}$$

$$S_{k'} = [\phi_{fz}, -e_1, \phi_a, -e'_2, \phi_E, -e'_3, \phi_b, -e'_4] \cdot f'$$

In the above the sign [. . .] means Gaussian Brackets, and this method of expression follows the description in the article "Gaussian Optics and Gaussian Brackets" by Herzberger in Pages 651 to 655, Vol. 33 (1943) of "Journal of Optical Society of America".

Here, the above equations are solved for $e'_3$, $e'_4$ and $\phi E$ by giving the amount of shifting ($e_2 - e'_2$) of the middle lens group 8 and the principal point interval $\Delta E$, then the following will be obtained:

$$e'_3 = L - (\Delta E + e'_4) - \frac{\alpha}{\alpha \cdot \phi_c - \beta}$$

$$e'_4 = \frac{\alpha}{\alpha \cdot \phi_c - \beta}$$

$$\phi_E = \frac{\alpha}{[\phi_{fz}, -e_1, \phi_a, -e'_2, \phi_b, -e'_3][-e'_4] f \cdot m}$$

In the above equation, $\alpha = S'_k - [\phi_{fz}, -e_1, \phi_a, -e'_2, \phi_b, (\Delta E + e'_2 - L)]$
$f \cdot m \beta = 1 - [\phi_{fz}, -e_1, \phi_a, -e'_2, \phi_b, (\Delta E + e'_2 - L), \phi_c] f \cdot m \ L = e_2 + e_3.$ That is, when the middle lens group is shifted from a position it occupies when an attachment lens is not mounted towards the direction of the front lens group ($e_2 - e'_2$) and an attachment lens having a power $\phi_E$ and a principal point interval of $\Delta E$ is provided at such position that the interval between the rear principal plane of the rear lens group and the front principal plane of the middle lens group is $e'_3$ (that is the interval between the rear principal plane of the attachment lens and the front principal plane of the rear lens group is $e'_4$), the focal distance can be made m times longer while the back focus distance is held unchanged.

Figure 8:
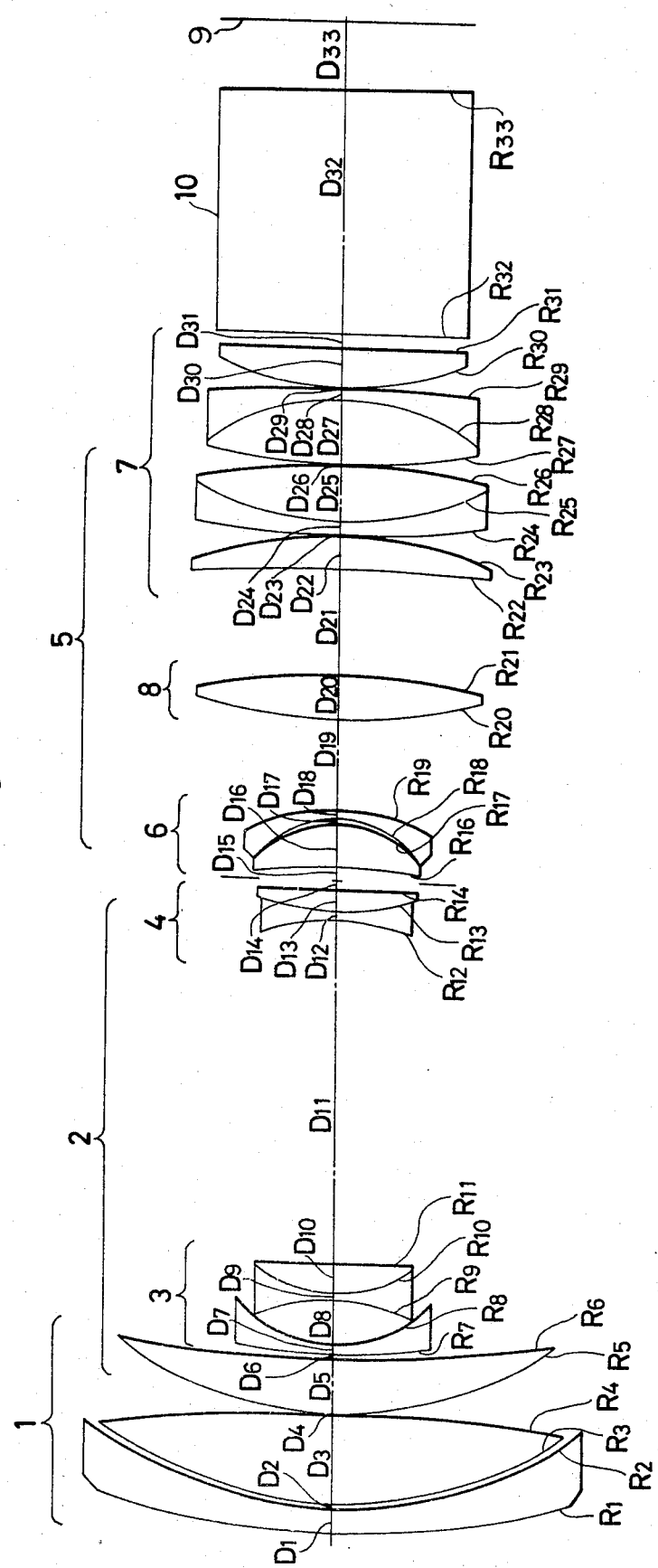
FIG. 8, and FIG. 9 are lens cross sectional views to show examples of a variable magnification optical system according to the present invention.
Figure 9:
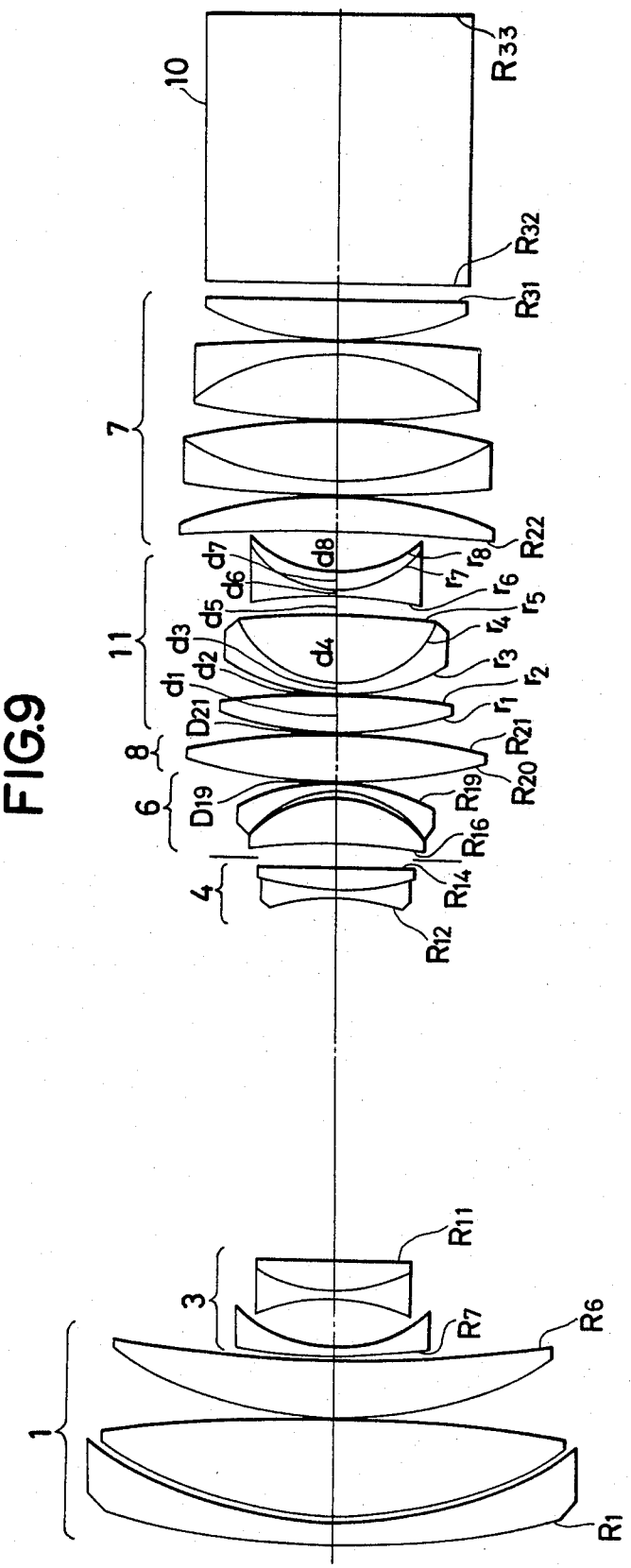

Now a concrete example corresponding to FIG. 7 will be shown in FIG. 8 and FIG. 9, both of which are lens cross sectional views, wherein FIG. 8 shows a case when an attachment lens is not mounted while FIG. 9 shows a case when the same is mounted.

First, power arrangement will be explained

| | |
|---|---|
| $\phi_{fz}$ (lens groups 1 & 2) | $-1/11.6$ |
| $\phi_a$ (lens group 6) | $1/845.6$ |
| $\phi_b$ (lens group 8) | $1/96.3$ |
| $\phi_c$ (lens group 7) | $1/59.1$ |
| $\phi_e$ (lens group 10) 1/110.7, $\Delta E$ 38.66 | |
| $e_1 = 53.62$ | $e'_1 = e$ |
| $e_2 = 1.95$ | $e'_2 = -14.65$ |
| $e_3 = 35.90$ | $e'_3 = -56.46$ |
| | $e'_4 = 70.29$ | amount of shifting of the movable lens group 8 ($e_2 - e'_2$) 16.6 magnification m of attachment lens 1.98

In a case when the attachment lens 11 is not mounted (FIG. 8):

| | | R | D | N | ν |
|---|---|---|---|---|---|
| 1 | 1 | 1972.36 | 4.00 | 1.80518 | 25.4 |
| | 2 | 77.73 | 1.20 | 1. | |
| | 3 | 78.88 | 17.00 | 1.60311 | 60.7 |
| | 4 | −350.23 | 0.20 | 1. | |
| | 5 | 74.78 | 10.25 | 1.60311 | 60.7 |
| | 6 | 280.66 | 0.83 | 1. | |
| 3 | 7 | 138.98 | 1.50 | 1.71300 | 53.9 |
| | 8 | 25.29 | 8.42 | 1. | |
| | 9 | −35.70 | 1.50 | 1.71300 | 53.9 |
| | 10 | 27.17 | 5.00 | 1.80518 | 25.4 |
| | 11 | 235.35 | 63.25 | 1. | |
| 4 | 12 | −38.58 | 1.25 | 1.77250 | 49.7 |
| | 13 | 50.59 | 4.00 | 1.80518 | 25.4 |
| | 14 | −1267.41 | 1.50 | 1. | |
| | 15 | | 2.50 | | |

-continued

|   |    | R       | D     | N       | ν    |
|---|----|---------|-------|---------|------|
| 6 | 16 | −116.08 | 8.09  | 1.53256 | 45.9 |
|   | 17 | −20.88  | 0.91  | 1.      |      |
|   | 18 | −20.12  | 1.50  | 1.80610 | 40.9 |
|   | 19 | −41.33  | 16.90 | 1.      |      |
| 8 | 20 | 95.48   | 8.32  | 1.60311 | 60.7 |
|   | 21 | −143.60 | 19.60 | 1.      |      |
|   | 22 | −479.37 | 6.34  | 1.48749 | 70.1 |

|    |    | R       | D     | N       | ν     |
|----|----|---------|-------|---------|-------|
| 7  | 23 | −79.47  | 0.30  | 1.      |       |
|    | 24 | 235.35  | 2.10  | 1.83400 | 37.2  |
|    | 25 | 57.37   | 10.79 | 1.64000 | 60.02 |
|    | 26 | −132/60 | 0.30  | 1.      |       |
|    | 27 | 140.85  | 11.64 | 1.48749 | 70.1  |
|    | 28 | −43.22  | 2.00  | 1.74950 | 35.2  |
| 7  | 29 | −350.23 | 0.30  | 1.      |       |
|    | 30 | 56.82   | 6.94  | 1.48749 | 70.1  |
|    | 31 | 2040.02 | 3.00  | 1.      |       |
|    | 32 | ∞       | 65.00 | 1.51633 | 64.1  |
| 10 | 33 | ∞       | 11.73 | 1.      |       |

In the above, 15 is a diaphragm.

$F_1$ (focal distance of the focusing part 1) = 103.76
$F_2$ (focal distance of the variator group 2) = −21.23
$F_4$ (focal distance of the compensator group 3) = −53.48
$F_6$ (focal distance of the front group 6) = 845.56
$F_8$ (focal distance of the middle group 8) = 96.35
$F_7$ (focal distance of the rear group 7) = 59.07

In a case when the attachment lens 11 is mounted:

|    |       | R       | D     |         | N       | ν    |
|----|-------|---------|-------|---------|---------|------|
| 6  | 16    | −116.08 |       | 8.09    | 1.53256 | 45.9 |
|    | 17    | −20.88  |       | 0.91    | 1.      |      |
|    | 18    | −20.12  |       | 1.50    | 1.80610 | 40.9 |
|    | 19    | −41.33  |       | 0.30    | 1.      |      |
| 8  | 20    | 95.48   |       | 8.32    | 1.60311 | 60.7 |
|    | 21    | −143.60 |       | 0.40    | 1.      |      |
|    | $r_1$ | 60.42   | $d_1$ | 6.63    | 1.55963 | 61.2 |
|    | $r_2$ | −196.47 | $d_2$ | 0.30    | 1.      |      |
|    | $r_3$ | 37.42   | $d_3$ | 1.80    | 1.75520 | 27.5 |
|    | $r_4$ | 20.25   | $d_4$ | 12.27   | 1.69680 | 55.5 |
| 11 | $r_5$ | −179.84 | $d_5$ | 3.27    | 1.      |      |
|    | $r_6$ | −93.03  | $d_6$ | 1.20    | 1.77250 | 49.7 |
|    | $r_7$ | 19.23   | $d_7$ | 3.33    | 1.80518 | 25.4 |
|    | $r_8$ | 24.07   | $d_8$ | 7.00    | 1.      |      |
|    | 22    | −479.37 |       | 6.34    | 1.48749 | 70.1 |
|    | 23    | −79.47  |       | 0.30    | 1.      |      |
| 7  | 24    | 235.35  |       | 2.10    | 1.83400 | 37.2 |
|    | 25    | 57.57   |       | 10.79   | 1.64000 | 60.2 |
|    | 26    | −132.69 |       | 0.30    | 1.      |      |
|    | 27    | 140.85  |       | 11.64   | 1.48749 | 70.1 |
|    | 28    | −43.22  |       | 2.00    | 1.74950 | 35.2 |
|    | 29    | −350.23 |       | 0.30    | 1.      |      |
| 7  | 30    | 56.82   |       | 6.94    | 1.48749 | 70.1 |
|    | 31    | 2040.02 |       | 3.00    | 1.      |      |
|    | 32    | ∞       |       | 65.00   | 1.51633 | 64.1 |

-continued

|    |    | R | D     | N  | ν |
|----|----|---|-------|----|---|
| 10 | 33 | ∞ | 11.73 | 1. |   |

In the above, R is a radius of curvature of lens; D is a lens thickness or an axial spacing; N is a refractive index; ν is an Abbe Number.

|           | $D_6$   | $D_{11}$ | $D_{14}$ | Focal distance of a variable magnification optical system when the attachment lens 11 is not mounted (Fig. 8) | Focal distance of a variable magnification optical system when the attachment lens 11 is mounted (Fig. 9) |
|-----------|---------|----------|----------|---------|---------|
| Wide-edge | 0.8281  | 62.253   | 1.5      | 22.003  | 11.129  |
| Middle    | 46.6361 | 11.4169  | 7.5281   | 93.257  | 47.170  |
| Tele-edge | 60.5777 | 3.4896   | 1.5138   | 215.976 | 109.240 |

As shown above, while the focal distance range is 11.129 to 109.240 when the attachment lens 11 is not mounted, it is shifted to 22.003 to 215.976 when the same is mounted.

FIG. 10 shows a lens arrangement diagram corresponding to FIG. 3. In said drawing, $e''_1$ is an interval between the rear principal plane of a system combining a focusing part and zooming part and the front principal plane of the front lens group 6, and $e''_2$ is an interval between the rear principal plane of the front lens group 6 and the front principal plane of the attachment lens 12, while $e''_3$ is an interval between the rear principal plane of the attachment lens 12 and the front principal plane of the middle lens group 8, and $e''_4$ is an interval between the middle lens group 8 and the front principal plane of the rear lens group 7. When the amount of shifting of the middle lens group 8 ($e_3 - e''_4$) and the principal point interval $\Delta E$ are given as known elements and the above mentioned equations are solved for $e''_2$, $e''_3$ and $\phi_E$, the followings are obtained:

$$e''_2 = L - (\Delta E + e''_4) - \frac{\alpha[-e''_4, \phi_c] - \beta[-e''_4]}{\alpha[\phi_{b'} - e''_4, \phi_c] - \beta[\phi_{b'} - e''_4]}$$

$$e''_3 = \frac{\alpha[-e''_4, \phi_c] - \beta[-e''_4]}{\alpha[\phi_{b'} 31 e''_4, \phi_c] - \beta[\phi_{b'} - e''_4]}$$

$$\phi_E = \frac{\alpha}{[-e''_3, \phi_{b'} - e''_4][\phi_{f_2} - e_1, \phi_a, -e''_2] f \cdot m}$$

In the above, $\alpha = S_{k'} - [\phi_{f_2} - e_1, \phi_a, (\Delta E + e''_4 - L), \phi_{b'} - e''_4] f \cdot m$ $\beta = l - [\phi_{f_2} - e_1, \phi_a, (\Delta E + e''_4 - L), \phi_{b'} - e''_4, \phi_c] f \cdot m$ $L = e_2 + e_3$ That is, when a movable group is shifted from the position it occupies when a magnification variation lens group is not mounted toward an image direction (direction of the rear group) as much as the shifting amount of ($e_3 - e''_4$), and a magnification variation lens group having a power $\phi_E$ and a principal point interval $\Delta E$ is provided at such position between the imaging lens front group and the movable group as having an interval $e''_2$ between the rear principal point of the front group and the front principal point of the magnification variation lens group (that is an interval $e''_3$ between the rear principal point of the magnification variation lens group and the front principal point of the imaging lens rear group), the focal distance range can be made m times longer while retaining the back focus distance constant.

Now, examples of values corresponding to a thin lens system of FIG. 6 (when a magnification variation lens group is not mounted) and that of FIG. 10 (when a magnification variation lens group is mounted) will be described below:

|  | Example 1 | Example 2 |
|---|---|---|
| $\phi_{fz}$ | −0.1 | −0.15 |
| $\phi_a$ | 0.001176471 | 0.003 |
| $\phi_b$ | 0.01 | 0.008 |
| $\phi_c$ | 0.016666667 | 0.021 |
| $e_1$ | 55 | 50 |
| $e_2$ | 2 | 15 |
| $e_3$ | 36 | 20 |
| $\phi_E$ | 0.017389 | 0.0139742 |
| $e'''_2$ | −42.8861 | −39.9321 |
| $e'''_3$ | 20.8861 | 37.4321 |
| $e'''_4$ | 20 | 10 |
| $\Delta E$ | 40 | 27.5 |
| $f$ | 9.8805149 | 5.16495044 |
| $s_{k'}$ | 75.120784 | 57.8407305 |
| $m$ | 2 | 1.7 |

FIG. 11 is a lens arrangement diagram corresponding to FIG. 4 mentioned above, and in said drawing, $e'''_1$ is an interval between the rear principal plane of a system combining a focusing part and a zooming part and the front principal plane of the front lens group 6, and $e'''_2$ is an interval between the rear principal plane of the front lens group 6 and the front principal plane of the attachment lens 13, while $e'''_3$ is an interval between the rear principal plane of the attachment lens group 13 and the front principal plane of the rear lens group 7, and $\Delta b$ is a principal point interval of the middle lens group 8.

Also, when the focal distance of the total system in a state the attachment lens 13 is not mounted is expressed by f, and the focal distance of the total system after said lens 13 is mounted is expressed by f', further the magnification of the shifting of the focal distance range is expressed by m ($> 1$), (1) the focal distance becomes m times longer, that is, $$f \cdot m = f',$$

(2) the back focus distance remains unchanged, that is, $$S_k = S_{k'},$$

(3) the length of the total lens system remains unchanged, that is, $$e''_2 + e''_3 + \Delta E = e_2 + e_3 + \Delta b.$$

And the focal distance f' at a time when an attachment lens group is mounted and the back focus distance $S'_k$ are given as follows:

$$f' = \frac{1}{[\phi_{fz}, -e_1, \phi_a, -e'''_2, \phi_E, -e'''_3, \phi_b]}$$
$$S'_k = [\phi_{fz}, -e_1, \phi_a, -e'''_2, \phi_E, -e'''_3] f'$$

Here when the above equations are solved for $e'''_2$, $e'''_3$, and $\phi_E$, the followings are obtained:

$$e'''_2 = L - \Delta E - \frac{\alpha}{\alpha \phi_c - \beta}$$

$$e'''_3 = \frac{\alpha}{\alpha \phi_c - \beta}$$

$$\phi_E = \frac{\alpha}{[\phi_{fz}, -e_1, \phi_a, -e'''_2] [-e'''_3] \cdot f \cdot m}$$

In the above, $$\alpha = S_{k'} - [\phi_{fz}, -e_1, \phi_a, (\Delta E - L)] \cdot f \cdot m$$

$$\beta = l - [\phi_{fz}, -e_1, \phi_a, (\Delta E - L), \phi_c] \cdot f \cdot m$$

$$L = e_2 + \Delta b + e_3$$

Figure 12:
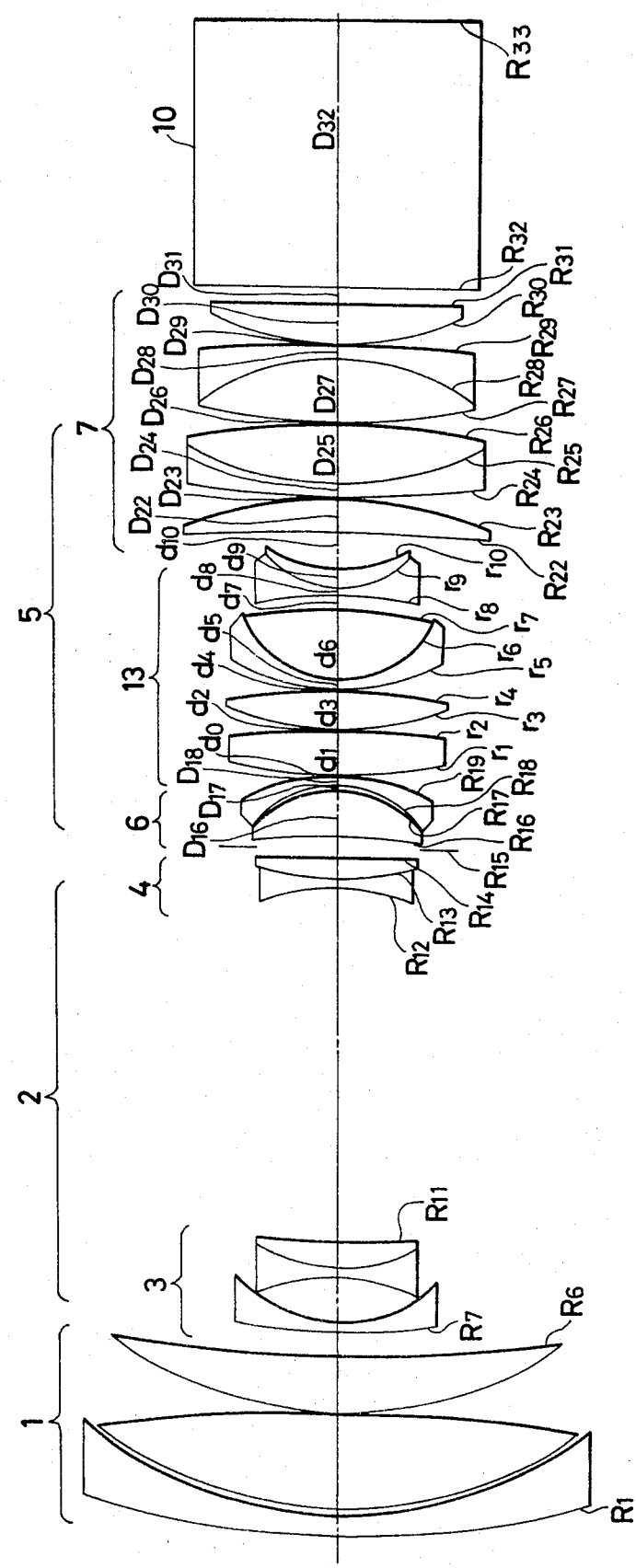
FIG. 12 is a lens cross sectional view to show another example of a variable magnification optical system according to the present invention.

That is, when the middle lens group 8 is removed and an attachment lens 13 having a power $\phi_E$ and a principal point interval $\Delta E$ is provided at a position of an interval $e'''_2$ between the rear principal point of the front lens group 6 and the front principal point of the attachment lens 13 (that is an interval $e'''_3$ between the rear principal point of the attachment lens 13 and the front principal point of the rear lens group 7), the focal distance is made m times longer while the back focus remains unchanged. FIG. 12 shows a lens cross sectional view in a case when the middle lens group 8 of the magnification variation lens shown in FIG. 8 is taken out of the optical path and the attachment lens 13 is mounted. Now, the data of the lens shown in FIG. 12 will be shown below:

Focal distance of the attachment lens 13 = 41.04
$\phi_E$ (attachment lens 13) = 1/41.04, $\Delta b = 3.06$
$\Delta E = 29.15$
$e_1 = 53.62 = e'_1$
$e_2 = 1.95$, $e'''_2 = -34.85$
$e_3 = 35.90$, $e'''_3 = 46.61$
$f = 11.13$
$S_k = S_{k'} = 71.85$

|  |  | R | D | N | ν |
|---|---|---|---|---|---|
| 1 | 1 | 172.36 | 4.00 | 1.30518 | 25.4 |
|  | 2 | 77.73 | 1.20 | 1. |  |
|  | 3 | 78.88 | 17.00 | 1.60311 | 60.7 |
|  | 4 | −350.23 | 0.20 | 1. |  |
|  | 5 | 74.78 | 10.25 | 1.60311 | 60.7 |
|  | 6 | 280.66 | 0.83 | 1. |  |
| 3 | 7 | 138.93 | 1.50 | 1.71300 | 53.9 |
|  | 8 | 25.29 | 3.42 | 1. |  |
|  | 9 | −35.70 | 1.50 | 1.71300 | 53.9 |
|  | 10 | 27.17 | 5.00 | 1.80518 | 25.4 |
|  | 11 | 235.35 | 63.25 | 1. |  |
| 4 | 12 | −38.58 | 1.25 | 1.77250 | 49.7 |
|  | 13 | 50.59 | 4.00 | 1.80518 | 25.4 |
|  | 14 | −1267.41 | 1.50 | 1. |  |
|  | 15 |  | 2.50 |  |  |
| 6 | 16 | −116.08 | 8.09 | 1.53256 | 45.9 |
|  | 17 | −20.88 | 0.91 | 1. |  |
|  | 18 | −20.12 | 1.50 | 1.80610 | 40.9 |
|  | 19 | −41.33 | $d_0=$ 0.30 | 1. |  |
| 13 | $r_1$ | 94.09 | $d_1=$ 8.32 | 1.60311 | 60.7 |
|  | $r_2$ | −175.43 | $d_2=$ 0.40 | 1. |  |
|  | $r_3$ | 60.12 | $d_3=$ 6.63 | 1.55963 | 61.2 |
|  | $r_4$ | −142.81 | $d_4=$ 0.30 | 1. |  |
|  | $r_5$ | 39.44 | $d_5=$ 1.80 | 1.75520 | 27.5 |
|  | $r_6$ | 19.44 | $d_6=$ 12.27 | 1.69680 | 55.5 |
|  | $r_7$ | −131.52 | $d_7=$ 3.27 | 1. |  |
|  | $r_8$ | −74.07 | $d_8=$ 1.20 | 1.77250 | 49.7 |
|  | $r_9$ | 17.61 | $d_9=$ 3.33 | 1.80518 | 25.4 |
|  | $r_{10}$ | 25.41 | $d_{10}=$ 7.00 | 1. |  |
| 7 | 22 | −479.37 | 6.34 | 1.48749 | 70.1 |
|  | 23 | −79.47 | 0.30 | 1. |  |
|  | 24 | 235.35 | 2.10 | 1.83400 | 37.2 |
|  | 25 | 57.57 | 10.79 | 1.64000 | 60.2 |
|  | 26 | −132.69 | 0.30 | 1. |  |
|  | 27 | 140.85 | 11.64 | 1.48749 | 70.1 |
|  | 28 | −43.22 | 2.00 | 1.74950 | 35.2 |
|  | 29 | −350.23 | 0.30 | 1. |  |

-continued

| | | | | | |
|---|---|---|---|---|---|
| | 30 | 56.82 | 6.94 | 1.48749 | 70.1 |
| | 31 | 2040.22 | 3.00 | 1. | |
| 10 { | 32 | ∞ | 65.00 | 1.51633 | 64.1 |
| | 33 | ∞ | 11.73 | 1. | |

| | $D_6$ | $D_{11}$ | $D_{14}$ | Focal distance of a variable magnification system at a time when the attachment lens 13 is not mounted. | Focal distance of a variable magnification optical system at a time when the attachment lens 13 is not mounted. |
|---|---|---|---|---|---|
| Wide-edge | 0.8281 | 62.253 | 1.5 | 22.003 | 11.129 |
| Middle | 46.6361 | 11.4169 | 7.5281 | 93.257 | 47.170 |
| Tele-edge | 60.5777 | 3.4896 | 1.5138 | 215.976 | 109.240 |

As shown above, while the focal distance range at a time when the attachment lens 13 is not mounted is 11.129 to 109.240, the focal distance range will be shifted to 22.003 to 215.976 when the attachment lens 13 is mounted.

What is claimed is:

1. A variable magnification lens group which can have a focal distance range easily shifted comprising, in the order given from an object end:
    a focusing lens group,
    a magnification variation lens, which varies the magnification of the luminous flux from said focusing lens group, an imaging lens group, which consists of a fixed front lens group, a movable middle lens group, a fixed rear lens group, and images the luminous flux from said magnification variation lens group, and
    an attachment lens, which is provided in a freely insertable and withdrawable manner within an optical path between said front lens group and said rear lens group, wherein a focal distance range of the total lens system is different between a case when said attachment lens is mounted and a case when the same is dismounted;
    in which said middle lens group is shifted along an optical axis of the lens system when the attachment lens is mounted.

2. A variable magnification lens according to claim 1, in which the above mentioned middle lens group is shifted toward the front lens group, and the attachment lens is provided between the middle lens group and the rear lens group.

3. A variable magnification lens according to claim 2, in which the middle lens group has a positive refractive power.

4. A variable magnification lens according to claim 1, in which the middle lens group is shifted toward the rear lens group and the attachment lens is provided between the middle lens group and the front lens group.

5. A variable magnification lens according to claim 4, in which said middle lens group has a positive refractive power.

* * * * *